United States Patent
Enke

[11] Patent Number: 6,053,489
[45] Date of Patent: Apr. 25, 2000

[54] ELASTIC BEARING STRUCTURES PARTICULARLY FOR WHEEL SUSPENSIONS OF MOTOR VEHICLES

[75] Inventor: Ernst-Ekkehard Enke, Altbach, Germany

[73] Assignee: DaimlerChrysler AG, Stuttgart, Germany

[21] Appl. No.: 09/115,479

[22] Filed: Jul. 15, 1998

[30] Foreign Application Priority Data

Jul. 16, 1997 [DE] Germany .................. 197 30 405

[51] Int. Cl.$^7$ ..................................... B60G 11/12
[52] U.S. Cl. ................... 267/270; 267/141.3; 267/153
[58] Field of Search ............. 267/141, 141.1–141.7, 267/153, 269, 270; 403/225, 226, 228

[56] References Cited

U.S. PATENT DOCUMENTS

| | | | |
|---|---|---|---|
| 1,939,444 | 12/1933 | Geyer | 267/270 |
| 3,020,036 | 2/1962 | Kleinschmidt | 267/154 |
| 3,685,772 | 8/1972 | Giaccone | 267/141.3 |
| 4,316,643 | 2/1982 | Burk et al. | 267/141.2 |
| 5,337,997 | 8/1994 | Hockney | 267/270 |

FOREIGN PATENT DOCUMENTS

| | | |
|---|---|---|
| 0 163 980 | 12/1985 | European Pat. Off. . |
| 0 698 743 | 2/1996 | European Pat. Off. . |
| 1 066 056 | 9/1959 | Germany . |
| 60-252836 | 12/1985 | Japan . |
| 6-129481 | 5/1994 | Japan . |
| 653 982 | 5/1951 | United Kingdom . |
| 2 115 080 | 9/1982 | United Kingdom . |

*Primary Examiner*—Robert J. Oberleitner
*Assistant Examiner*—Mariano Sy
*Attorney, Agent, or Firm*—Klaus J. Bach

[57] ABSTRACT

In an elastic bearing for mounting wheel support arms of motor vehicles wherein an inner bearing sleeve surrounded by an elastic intermediate sleeve is disposed in an outer mounting sleeve, the outer mounting sleeve has a cylindrical axial center section for firmly supporting the elastic bearing in a corresponding cylindrical support structure and axially opposite end portions which are recessed axially inwardly and provided with a cover layer of rubber-like material which extends over and protects the inwardly recessed end portions of the outer mounting sleeve.

8 Claims, 1 Drawing Sheet

ELASTIC BEARING STRUCTURES PARTICULARLY FOR WHEEL SUSPENSIONS OF MOTOR VEHICLES

BACKGROUND OF THE INVENTION

The invention relates to an elastic bearing structure, particularly an elastic wheel support arm bearing for motor vehicles, with an inner bearing sleeve and an outer sleeve connected to the inner sleeve by an intermediate resilient structure with an axial cylindrical support area which is fixed to the center of a support member of a wheel support arm and which includes projecting end sections.

Elastic bearings of this type are used in practice as support structure for wheel support arms, for example for the mounting of the rear wheel suspension of, among others, the passenger cars type 190/190E of the series 201 of Daimler-Benz AG, which went into mass production in December 1982 and has been on the market for many years (see Mercedes-Benz Service, "Einführungsschrift für den Kundendienst" PKW-Typen 201 (190/190E) page 158, FIGS. 40/35). They are pressed with their outer sleeve into an eye of the respective wheel support arm wherein the press fitting (metal on metal) must insure firm engagement. As far as the bearing is covered by the eye receiving it, a certain corrosion protection is provided. The end areas of the outer sleeve projecting beyond the eye are subjected to ambient attacks. They should also be protected from ambient influences.

This is possible for example by an appropriate selection of the material of which the outer sleeve is made, for example, by making the outer sleeve of aluminum. This, however, has the disadvantage that the adjacent components such as the steel support arms do not consist of aluminum and are subjected to tension corrosion. It is also possible to galvanically coat the outer sleeves. This however requires careful assembly so that the protective coating is not damaged during assembly or at other occasions if the additional expenses for durable protection are to be justifiable.

DE-AS 10 66 056 discloses an elastic bearing in the form of a rubber sleeve spring which, in the embodiment as shown in FIG. 6, includes a sleeve-like insert arranged close to the inner and outer circumferences and which is vulcanized into the rubber body such that the rubber is compressed during installation whereby the rubber sleeve spring is fixed in the eye of the opposite part.

In the axial cylindrical support area, the sleeve-like inserts are expanded so as to be annularly bulged whereby the annular bulge penetrates the outer rubber spring layer and, in this way, comes into direct contact with the eye portion in which it is received. In this way, in addition to the fixing of the rubber sleeve spring by way of their radially inner or, respectively, radially outer rubber layer in the axial cylindrical support area of the rubber spring, the rubber spring sleeve is centered and, with the line-like support, an axial movement of the bearing is prevented even with high speed drives. The rubber sleeve spring is arranged in the known designs so as to extend over the full length of the respective bearing support structure so that the question of corrosion is not acute nor are there any corrosion tendencies with such designs.

It is the principal object of this invention to provide a support structure in which corrosion is prevented by simple and inexpensive means.

SUMMARY OF THE INVENTION

In an elastic bearing for mounting wheel support arms of motor vehicles wherein an inner bearing sleeve surrounded by an elastic intermediate sleeve is disposed in an outer mounting sleeve, the outer mounting sleeve has a cylindrical axial center section for firmly supporting the elastic bearing in a corresponding cylindrical support structure and axially opposite end portions which are recessed axially inwardly and provided with a cover layer of rubber-like material which extends over and protects the inwardly recessed end portions of the outer mounting sleeve.

With this measure, the end areas are included in the vulcanizing procedure during manufacture of the rubber bearing so that they are protected from corrosion. The free end areas of the outer sleeve are provided with a skin-like cover whose thickness is in the area of 0.5 mm. the cover may extend over protective layers which are already applied so as to serve as protection to prevent damage to such layers.

It is particularly simple and inexpensive if the same material is used for the elastic intermediate layer and the cover layer. But it is also possible to use different materials.

In connection with the radial cover according to the invention, also an axial cover of the end portions may be advantageous and it may also be advantageous if the intermediate elastic layer protrudes in axial direction with respect to the outer sleeve.

Further features and details of the invention will become more readily apparent from the following description thereof on the basis of the accompanying drawings.

DESCRIPTION OF A PREFERRED EMBODIMENT

Figure 1:
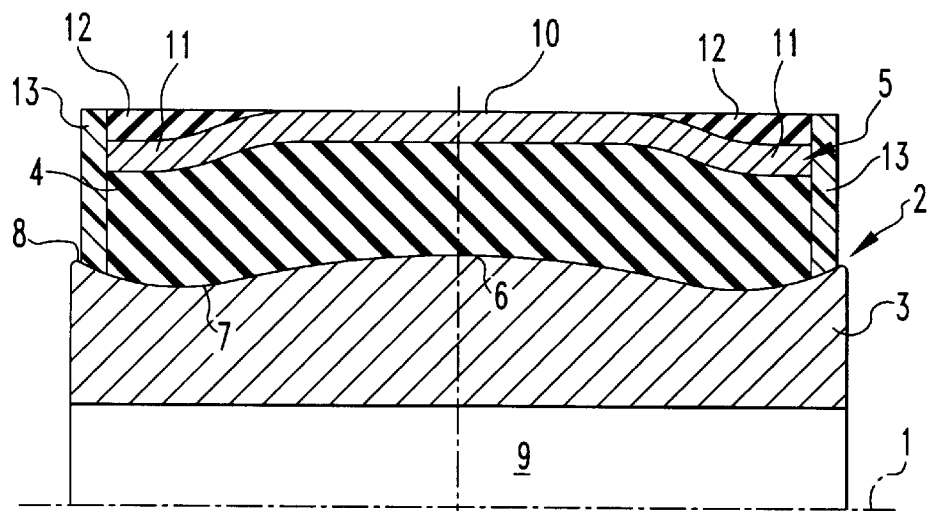
FIG. 1 is a cross-sectional view showing schematically an elastic bearing according to the invention.

The figures show only one half of the bearing which is symmetrical with respect to the longitudinal center axis 1. The bearing includes an inner bearing sleeve 3 around which an elastic intermediate sleeve 4 is disposed surrounded by an outer sleeve 5. The inner bearing sleeve 3 is contoured over its axial length with a diameter increasing toward the axial center and the axial ends so that the largest diameter 6 is in the center area of the sleeve 3 and large diameters are also at the end sections 8 while the smallest diameter areas 7 are disposed between the center area 6 and outer areas 8. The inner sleeve 3 includes a central axial bore 9 and is somewhat longer than the intermediate sleeve 4 surrounding the inner sleeve 3 so that the inner sleeve 3 projects axially from the opposite axial ends of the intermediate sleeve 4. The intermediate sleeve 4 is surrounded by the outer sleeve 5 which essentially follows the shape of the inner sleeve 3 so that it too has its largest diameter in the center area thereof which however is essentially cylindrical and forms the support area 10 by which the bearing 2 is supported in the support eye of a structure which is not shown but which is for example the bearing eye of a wheel support arm in which it is received by a press fit. Adjacent the center support area 10, there are radially inwardly recesses areas 11 which are covered, over their axial length, by a cover layer 12 of a rubber-like material. The cover extends axially outwardly from the center support area 10 and forms a corrosion protection layer which may be relatively thin, that is, it may have a thickness of only 0.5 mm.

The layer 12, which serves as a cover, consists of the same material as the elastic intermediate sleeve 4 which facilitates the manufacture of the bearing. But it is also possible to select a different material if a different material for the layer 12 better fulfills a particular object.

Figure 2:
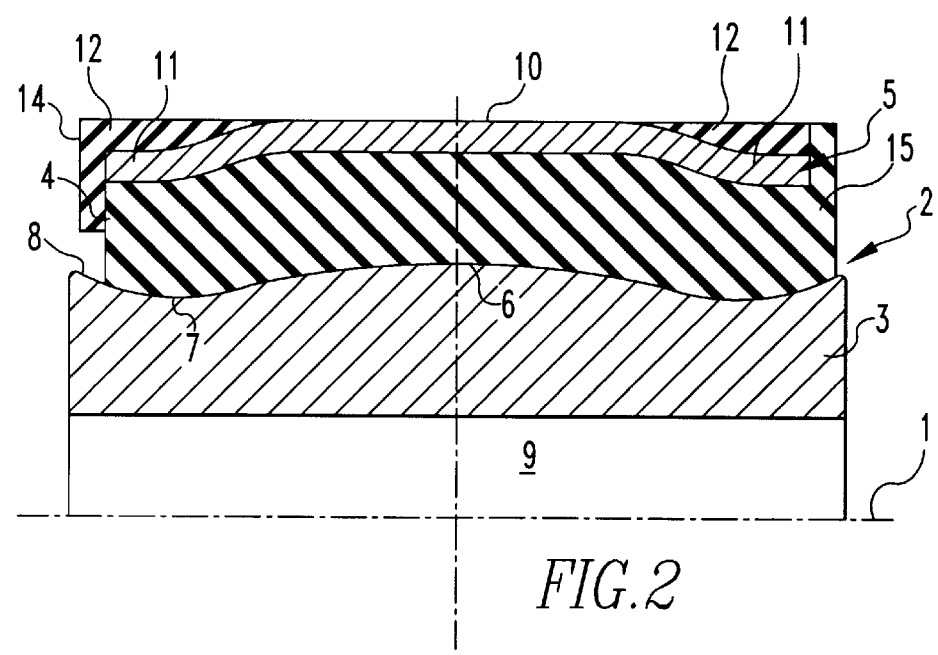
FIG. 2 shows other embodiments of the invention.

The intermediate sleeve 4 which, in the example shown in the figures, has about the same thickness over its full axial length and the layer 12 may be joined at the axial ends of the bearing as shown on the right hand side of FIG. 2 particularly if they consist of the same material whereby a protective cover layer for the outer sleeve 5 is formed also at the axial ends of the bearing. To protect the opposite axial ends of the outer sleeve 5, it is also possible to provide protective rings 13 at the axial ends which rings extend between the intermediate sleeve 4 and the layer 12 as indicated in FIG. 1.

Also, as shown in FIG. 2 (left hand end), the cover layer 12 may include an area 14 which extends radially over the axial end face of the outer sleeve 5. Furthermore, as shown in FIG. 2 (right hand end), the elastic intermediate sleeve may include a portion 15 extending radially outwardly over the end faces of the outer sleeve 5.

What is claimed is:

1. An elastic bearing comprising an inner bearing sleeve, a concentric outer mounting sleeve, and an elastic intermediate sleeve disposed between, and interconnecting, said inner bearing sleeve and said outer mounting sleeve, said outer mounting sleeve having a cylindrical axial center section and reduced-diameter opposite axial end portions with end faces and a cover layer of rubber-like material disposed on said reduced-diameter axial end portions of said outer mounting sleeve for firmly supporting said elastic bearing in a corresponding cylindrical support structure while preventing corrosion of said outer mounting sleeve in said cylindrical support structure, said elastic intermediate sleeve including a portion extending radially outwardly over the axial end face of said outer mounting sleeve and into contact with said cover layer of rubber-like material on the reduced-diameter end portion of said outer mounting sleeve.

2. An elastic bearing according to claim 1, wherein said cover layer is vulcanized onto said end portions of said mounting sleeve.

3. An elastic bearing according to claim 1, wherein said cover layer and said intermediate sleeve consist of the same materials.

4. An elastic bearing according to claim 1, wherein said cover layer and said intermediate sleeve consist of different materials.

5. An elastic bearing comprising an inner bearing sleeve, a concentric outer mounting sleeve, and an elastic intermediate sleeve disposed between, and interconnecting, said inner bearing sleeve and said outer mounting sleeve, said outer mounting sleeve having a cylindrical axial center section and reduced-diameter opposite axial end portions with end faces and a cover layer of rubber-like material disposed on said reduced-diameter axial end portions of said outer mounting sleeve for firmly supporting said elastic bearing in a corresponding cylindrical support structure while preventing corrosion of said outer mounting sleeve in said cylindrical support structure, and axial end covers extending radially over said elastic intermediate sleeve, said outer mounting sleeve and the cover layers disposed on the reduced-diameter end portions of said outer mounting sleeve.

6. An elastic bearing according to claim 5, wherein said cover layer is vulcanized onto said end portions of said mounting sleeve.

7. An elastic bearing according to claim 5, wherein said cover layer and said intermediate sleeve consist of the same materials.

8. An elastic bearing according to claim 5, wherein said cover layer and said intermediate sleeve consist of different materials.

* * * * *